Sept. 19, 1944. E. G. ASHCRAFT 2,358,374
APPARATUS FOR DETERMINING PHYSICAL PROPERTIES OF FLUIDS
Original Filed Dec. 19, 1939
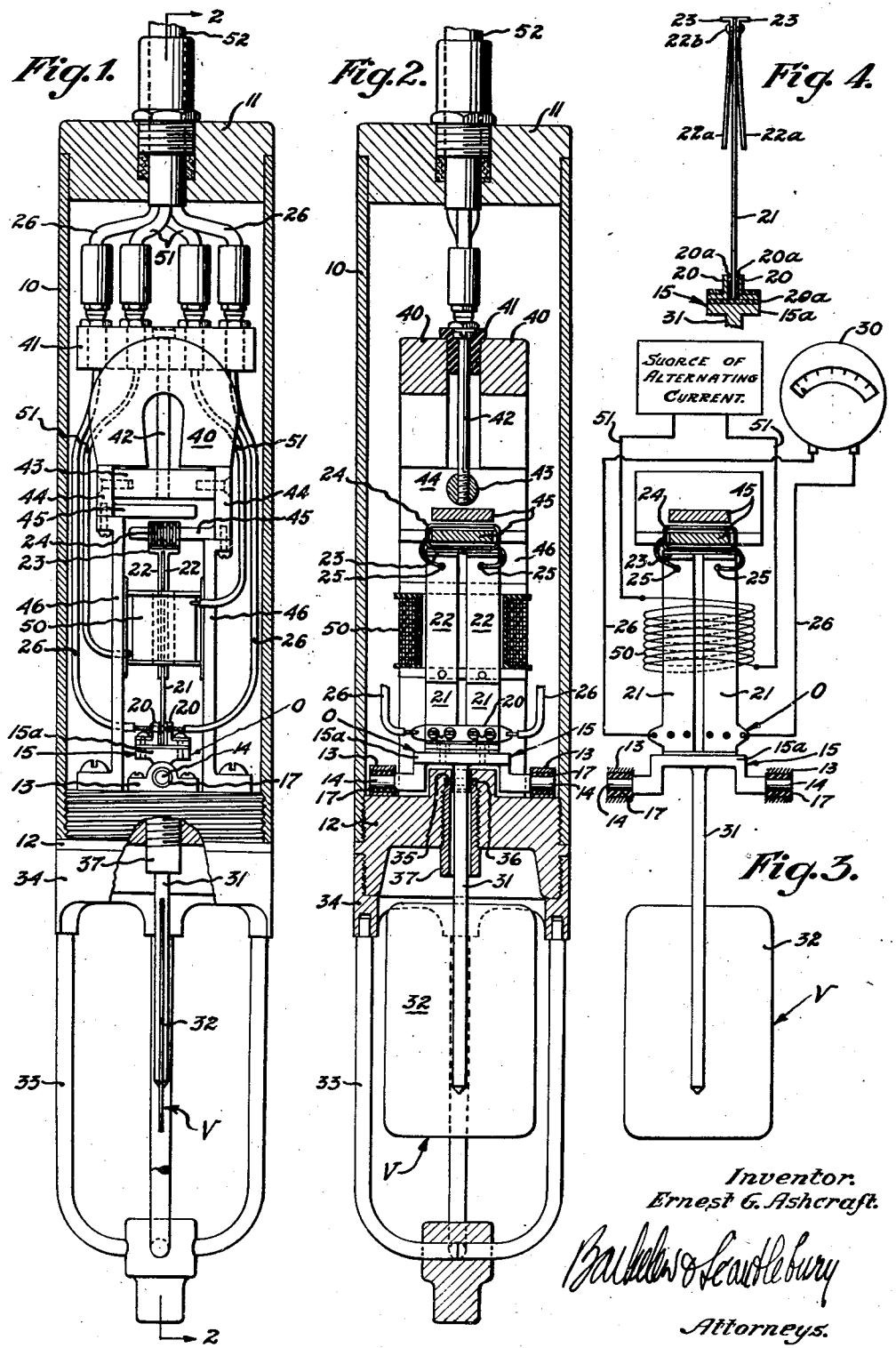
Inventor:
Ernest G. Ashcraft.
Attorneys.

Patented Sept. 19, 1944

2,358,374

UNITED STATES PATENT OFFICE 2,358,374

APPARATUS FOR DETERMINING PHYSICAL PROPERTIES OF FLUIDS

Ernest G. Ashcraft, Long Beach, Calif.

Continuation of application Serial No. 309,986, December 19, 1939. This application August 13, 1941, Serial No. 406,590

7 Claims. (Cl. 73—32)

This invention relates generally to apparatus for determining certain physical properties of fluids, and particularly for determining specific gravity. The present application is a continuation of my prior copending application of the same title, filed December 19, 1939, Ser. No. 309,986.

It is a general object of the invention to provide an instrument for determining efficiently and accurately, either intermittently or continuously, the specific gravity of a fluid.

It is also an object to provide such an instrument that determinations may be made, if necessary, in inaccessible fluids, as fluids in tanks or pipe lines or in the bore of a deep well, or in fluids which are held under pressure or subjected to heat, or undergoing some treatment or change as in chemical processes.

The invention is hereinafter explained with liquids chiefly in view, and the present illustrative embodiment has been designed for measurement of density or specific gravity of liquids; it is to be understood, however, that the underlying principles of the invention are equally applicable to measurement of density of gases, and no limitation to liquids is therefore to be implied.

In accordance with the present invention, there is provided a vibratory liquid coupling element or vane, immersible in the liquid to be tested. This vane, whose function is to move a mass of the liquid in which it is immersed, may be regarded broadly as a surface, or pair of oppositely facing surfaces, in contact with the liquid. In accordance with one specific form of the invention, this vane may be in the nature of a substantially rigid, pivoted paddle or blade-like element, though other forms of vane, such as the diaphragm form disclosed in Patent No. 1,570,781 to Ruben, or other modifications, might be substituted. Whenever I hereinafter refer to a vane, it will be understood that I employ the expression in a broad and inclusive sense, and that I contemplate broadly any surface of substantial area adapted to contact the liquid, which surface is movable in a direction normal to itself, so as to move a substantial mass of the liquid.

An alternating accelerative force is applied to this vane in a normal direction. This applied force moves the vane, and with it, a certain volume and mass of the liquid. The acceleration accepted by the vane and the moved mass of liquid, for a given applied force, depends upon the inertia, or mass, of the vane and of the moved liquid, in accordance with Newton's second law of motion. The inertia or mass of the liquid being proportional to the specific gravity of the liquid, the acceleration so resulting from a given applied force is hence a measure of the specific gravity. Stated in another way, the relationship between the acceleration of the vane and the effective applied force is a measure of the specific gravity.

The impedance offered by the liquid to the movement of the vane may be divided into two parts or components, that due to the inertia of the liquid, and that due to viscosity or frictional loss in the liquid.

The inertia component of the impedance offered by the liquid is the equivalent of the effect that would be produced by a mass affixed directly to the vane. This fact underlies and distinguishes the present invention, and will be adverted to later.

The viscosity or frictional loss factor is a resistive force which is subtractive from the accelerative or driving force applied to the vane. Its effect is to reduce the acceleration produced by a given applied driving force, the effective or resultant driving force available for accelerating the vane becoming the total applied force minus the resistive force owing to viscosity or other frictional losses. Since the specific gravity of the liquid is to be evaluated from the relationship between applied force and acceleration, the effects of viscosity or frictional loss in the liquid must be reduced to negligible proportions. This is accomplished by the present invention partly in the design of the vane, which is made of substantial facial area, so as to augment the mass reaction effects of the liquid, and with minimized peripheral edge areas in shearing relation with the liquid. Further, the vane is preferably substantially rigid rather than subject to distortion, since a distorting vane sets up components of liquid flow at right angles to the direction of drive of the vane, and hence increases frictional losses. The effects of mass are further made to predominate strongly over the effects of frictional or resistive losses by employing high accelerations in reverse directions, accomplished by driving the vane by an alternating force, preferably sinusoidal in nature, such as may be derived from alternating current power mains. A frequency of 60 cycles per second has been found suitable in practice.

In accordance with the present invention, the described vane is caused to be driven by, or may be considered as forming a part of, a mechanical vibrator or oscillator, in which forced oscillations are established by driving it through electromagnetic means from an alternating current power source. This vibrator or oscillator has a natural resonant frequency or period which depends upon its stiffness, mass, and distribution of mass, and which is varied through a substantial range by the different mass reactions of liquids of different specific gravities in which the vane is immersed. The effect on the resonant frequency of immersing the vane in liquids of different specific gravities is the same, in fact, as though different masses were affixed to the vane. This modification of the resonant frequency of the oscillator, which for practical purposes is entirely independent of viscosity or frictional losses in the liquid, and is strictly a measure of specific gravity, may be made to manifest itself and be brought to an indication in various ways. For instance, as one present preferred possibility in accordance with the invention, if the frequency of the driving force be held constant, the variation in resonant frequency accompanying variation in mass reaction on the vane results in either an approach toward, or a recession from, the frequency of the driving force, which in turn means either increase or decrease in amplitude and velocity of vane movement for the given applied driving force. For such conditions, therefore, amplitude or velocity of vane movement may be taken as the measure of the modification of the resonant frequency of the oscillator, and therefore of the specific gravity of the liquid loading the oscillator. Of course, if certain constants of the system were varied, or allowed to vary, the amplitude of vane movement might not indicate specific gravity directly; for instance, variation in strength of driving force would modify the amplitude of vane movement, as would variation in the frequency of the driving force. But the relationship of vane amplitude or velocity to driving force strength, or to driving force frequency, may be taken as measures of the specific gravity.

As one means for bringing the amplitude or velocity of vane movement to an indication, I may connect thereto a flexible, resilient vibratory reed, which provides an amplified movement that is proportional to the movement of the vane. The indication may be obtained roughly by visual observation of angular deflection of this reed, or may be obtained to greater accuracy by mounting on the reed a coil which cuts a magnetic field and generates a voltage, the latter being easily read on a suitable meter. This particular indication means is but one of many possibilities, however, and the invention is not to be considered as limited to use of the reed as an indication means.

The invention in all its aspects, including further objects, features and advantages, not above mentioned, will be fully understood by now referring to the following detailed description of a present preferred embodiment thereof, reference for this purpose being had to the accompanying drawing, in which:

Fig. 1 is a central longitudinal section of one form of instrument;

Fig. 2 is a central longitudinal section taken on a plane at right angles to the plane of Fig. 1;

Fig. 3 is a diagram illustrating the electrical connections of the instrument; and Fig. 4 is a detail showing a modified form of reed structure.

In the drawings, numeral 10 designates a suitable casing which may preferably be cylindric as illustrated and closed at its upper end by a cap or plug 11 and at its lower end by a plug 12 which may preferably be screw-threaded into casing 10. The completed casing is made fluid-tight to prevent entry of fluids into it. All of the internal mechanism of the device is preferably mounted on the plug 12 so as to facilitate removal from casing 10, plug 12 thus serving as the stationary mounting means of the mechanism.

Mounted on plug 12 is a fulcrum means for a pivoted mechanical oscillator O. In the particular embodiment of the invention here shown, this fulcrum means includes a pair of supporting blocks 13 which receive and support, through the intervention of rubber or similar sleeves 17, the pivot ends 14 of a supporting member or mount 15 for the vibratory vane V. The central part or saddle 15a of this mount 15 is preferably offset upwardly from the pivots 14, for a purpose which will appear hereinafter. The rubber sleeves 17 fit tightly within the bearing or supporting blocks and tightly around the pivots, so that the mount 15 is thus carried on the mounting structure which allows pivotal movement by reason of the yielding or elastic quality of the mount rather than by relative surface movement. The rubber sleeves 17 provide a resilient or elastic compliance, supporting the mount 15 and parts affixed thereto for relative pivotal action on the axis of the pivots 14, and at the same time giving the pivotally mounted system a certain stiffness against pivotal action. Any other suitable pivotal compliance may of course be substituted for the rubber sleeves and pivots, that here shown being simply one illustrative form.

In the particular simple form of the invention here chosen for illustrative purposes, the indication is taken from the instrument by means of a reed or reeds upstanding from the mount 15. Thus, there are mounted directly on the saddle 15a two angle brackets 20, and between these two angle brackets I secure the lower end of the indicator reed or reeds 21. This reed element may be single; I show it here preferably as double. The reeds normally stand in vertical position and are composed of some suitable elastic or resilient material, as spring steel. Their lower ends are insulated from the brackets 20 and from saddle 15a by the insulation shown at 20a, being best shown in Fig. 4. This insulation not only insulates the reeds from the mounting but also insulates the two reeds 21 from each other.

In the form of device shown in Figs. 1 and 2 the reeds are provided, in the upper portions of their lengths, and on their opposite faces, with armature plates 22, preferably of suitable iron, such as transformer iron. The upper ends of these armature plates 22 are angled outwardly as at 23 to form a base upon which the small generating coil 24 may be rigidly mounted. This coil is hollow, for purposes which will be hereinafter apparent. The two terminals of coil 24 are electrically connected at 25 with the two reeds, and two lead wires 26 are connected respectively to the two reeds at their lower ends. These are the two lead wires which go to the indicating instrument 30 which is shown in Fig. 3.

Solidly attached to the saddle 15a and depending therefrom is a rod or beam 31 which extends through the plug 12 and, depending therebelow, carries at its lower end the vane V, here shown in the form of a thin blade or paddle 32, and disposed in a plane at right angles to the direction of vibration of the pivoted system. To protect the vane from injury an open cage 33 may be mounted upon a ring 34 which is threaded upon the plug 12. The rod 31 has clearance with respect to plug 12 where it passes through that plug, so as to allow the small freedom which is necessary to allow vibratory movement of vane V and rod 31. The vertical opening through the plug provides a shoulder 35 against which a rubber packing washer 36 is set by a packing following sleeve 37. The packing washer is compressed longitudinally and is thus expanded radially so as to tightly contact with both the plug 12 and the rod 31. And it will be noted that the packing washer is located substantially in a plane on the axis of pivots 14, so that it engages rod 31 at a point where the rod movement is at a minimum.

Rod 31 is of such size and stiffness that, within the limits of the bending forces applied to it in operation of the instrument, it is virtually rigid. And vane V is composed of such a material and is of such dimensions as to be light in weight but preferably also rigid. I have found "Bakelite" to be a suitable substance. Typical dimensions of parts of the instrument are given hereinafter.

Mounted in the upper part of the instrument I provide a magnetic means which performs two functions; both the function of supplying a magnetic field for the polarized reed armatures and the function of providing a magnetic field for the generating coil 24. This magnetic means is preferably in the form of a permanent magnet, here shown as two permanent magnets 40 which are held in place by a clamping block 41 held down by a screw 42 which, at its lower end, threads into a non-magnetic cross member 43 which is mounted between the two pole pieces 44. The lower ends of the permanent magnets 40 are thus clamped down on the two pole pieces 44. These two pole pieces extend downwardly from the magnets and each has a horizontal pole piece extension 45, the two extensions being spacedly arranged one above the other, as illustrated. Generating coil 24 surrounds one of the extensions and a part of the coil winding lies between the two vertically spaced extensions. At their lower ends the pole pieces 44 are mounted upon two supports 46 which in turn are mounted at their lower ends on the plug 12. These supports 46 are also preferably of magnetic material of high permeability, such as soft iron, so that they form pole piece extensions which effectively carry the magnetic field down to levels directly opposite the reed armatures 22, the plug 12 being preferably of non-magnetic material.

An exciting coil 50 is mounted upon supports 46 and surrounds the reeds and their armatures. Leads 51 provide a circuit for supplying the exciting coil with alternating current from any suitable source. In the diagram of Fig. 3 a source of such current is indicated. In one form in which my instrument is used, this source of current may be any ordinary single phase alternating current supply, so long as the frequency is comparatively constant and is within a range suitable to the instrument. The coil 50 being excited by an alternating (preferably sinusoidal) electric current, of typical commercial power circuit frequency, the reed armatures 22 are alternately polarized in reverse directions, and, reacting with the fields of the magnets 40, cause the reeds, the mount 15 and the vane to be vibrated under the influence of an electromagnetically derived alternating driving force of similar frequency. The vibration of the mount 15 and of the vane may be very small in amplitude, the amplitude of vane movement being typically of the order of a few thousandths to perhaps a thirty second of an inch, whereas the flexible reeds deflect through substantially amplified angles.

The leads 51 leading to coil 50 may be extended through a cable 52, along with the leads 26 from generator coil 24, to any suitable points. In some uses of my instrument it may be necessary or desirable to use a battery or similar source of power for the instrument. In that case any suitable battery source, together with any suitable means which produces an alternating current of suitable wave form and suitable frequency, may be used to excite coil 50, and where such a battery source is used it may be carried within the casing 10, suitably enlarged for that purpose.

I have indicated that generating coil 24 is directly connected to the indicating instrument 30. In practice I find that a sufficient current or voltage may be generated by coil 24 to operate a milliammeter or millivolt meter; but if so desired any suitable amplifying or other system may be connected at the indicator circuit, and any suitable form of indicator means may be used.

In Fig. 4 I have shown a modified form of reed and reed armature arrangement. In the form shown in Figs. 1 and 3 the vibratory length of reed is substantially equal to the vertical distance between the mounting brackets 20 and the lower ends of the armature plates 22 which are fixedly attached, as by riveting, to the reeds. In the form shown in Fig. 4 the reeds 21 are mounted as I have described, but the armature plates 22a are affixed only at 22b at their upper ends to the upper ends of the reeds, the armature plates diverging slightly outwardly from the reeds. Thus the effective vibrating length of the reeds becomes in this case the vertical distance between the upper edges of mounting brackets 20 and a point near the upper ends of the reeds just below the attachment 22b. The coil 24 is mounted on the upper end of the structure in the same manner as shown in Figs. 1 and 2.

In the typical case where exciting coil 50 is supplied with sixty cycle alternating current, the reeds 21 are designed to have a free resilient vibration periodicity of approximately sixty cycles per second. An industrial instrument designed in accordance with the invention exhibits a natural reed periodicity of about 56 cycles, and operates satisfactorily on 60 cycle current. In the form of reed shown in Fig. 4, for such a periodicity, the effective bending length of the reeds is approximately 2¾", and the two reeds and the two sets of reed armatures, are each $\frac{7}{16}$" wide and 18 mils thick. To give a further idea of the dimensions and masses of an instrument which is efficient and accurate in operation, I may state that Figs. 1 and 2 of the drawing are approximately three-quarters scale of a full sized instrument. And in such an instrument I may also state that the vane 32 may be made of "Bakelite," $\frac{1}{32}$" thick, and have an area of 1¼ sq. in., the center of that area being 2½" below the axis 14. This arrangement, together with the mass of generating coil 24, which is composed of 600 turns of No. 40 enameled wire of the proportionate coil size illustrated, makes a flexible, resilient vibrating system having a definite natural periodicity in air, which is modified to different degrees by the mass reactions of liquids of different specific gravities.

The exciting coil 50 as here shown may typically consist of about 12,500 turns, have a D. C. resistance of 5000 ohms, and operate on 110 volts 60 cycle alternating current.

From the above detailed description of a specific illustrative embodiment of the invention, it will be seen that I have provided an oscillator, of which the vane V forms a part, so designed that the vane may vibrate in the liquid to be tested. Some part of the oscillator has the property of stiffness (elasticity), and the vibratory parts of the oscillator, together with the quantity of liquid moved by the vane, constitute the overall mass of the vibratory system. The oscillator is driven through electromagnetic coupling from an exciting coil in which flows an alternating driving current of a frequency which, in the present specific embodiment of the invention, is fixed, and may typically be sixty cycles. In the illustrated embodiment, the oscillator derives its stiffness property mainly from the elastic supporting elements 17 forming the compliance at the pivot axis.

Now this oscillator has one or more natural resonant frequencies which depend upon its stiffness, the stiffness of the compliance, and upon the mass and mass distribution of its vibratory parts, as well as upon the mass of any liquid that is moved by the vane. A present instrument constructed in accordance with the above description of an illustrative embodiment exhibits, on test in air, a fundamental resonant point at a frequency of about 45 cycles per second, and a strong second harmonic resonant point at a frequency of about 90 cycles per second. It is to be understood that I here speak of the resonant frequencies of the vibratory system as a whole, and not of the reed with respect to its mount 15. Immersing the vane in liquid forces the vibrating vane to move a certain mass of the liquid, and thus adds mass to the system, which decreases the above mentioned resonant frequencies.

It is known that a mechanical oscillator of the general class described has a maximum response point (maximum amplitude and velocity) when its natural resonant frequency equals the frequency of the driving force, which in this instance is the frequency of the alternating current flowing in the exciting coil. Hence, for a given driving frequency, and an instrument of given mass and stiffness constants, a liquid of some particular specific gravity will cause the resonant frequency of the system to equal the driving frequency, and therefore cause a vane deflection of maximum amplitude and velocity. This is the condition of resonance.

At resonance, the mass reactance owing to the mass of the oscillator plus the mass of the liquid moved by the paddle is just balanced by the elasticity reactance owing to the compliance, i. e., elastic supports, and to other elastic parts of the oscillator. As the vibrating vane travels in either direction past center the kinetic energy of the moving mass, including the mass of the moved liquid, goes to strain the elastic parts of the oscillator, and when the vane then reverses direction, the potential energy so stored in the elastic parts is returned and exerts a force to accelerate the mass, the frictional loss in the resilient mounting such as a rubber or a spring mounting, being small and relatively unimportant. And there is just enough energy so stored in the elastic parts to take care of the acceleration of the mass of the system, including the mass of the moved liquid, so that the driving force electromagnetically derived from the driving coil has only the work of overcoming the non-reactive or frictional resistances offered by the liquid.

In other words, the mechanical impedance has a defined minimum, and the amplitude and velocity of vane movement experience a corresponding peak, the relations being as follows:

$$\text{Vane velocity} = \frac{\text{Driving force}}{\text{Impedance}}$$

The foregoing states the situation as it would exist with the oscillator so loaded that it has become resonant with the driving frequency, though the present instrument in practice, is preferably so designed that the various liquid loads put upon it vary its natural period through an operating range of frequencies to one side of the driving frequency. And when the mass loading of the vane by the liquid is not such as to produce the described condition of resonance, the period of the liquid loaded vibratory system will be some frequency not equal to the period of the driving force, the mass and elasticity reactances will not be in balance, and the mechanical impedance will accordingly become greater. The amplitude and velocity of the vane are hence less than at resonance. In this way, the amplitude and velocity of the vane vary with and constitute a measure of the mass loading of the vane by the liquid, and are therefore a measure of specific gravity.

From the above it will be seen that the amplitude and velocity of the vane depends upon the reactive mass loading component of the impedance into which the oscillator works, increasing as that component becomes more nearly equal to, and more nearly balances, the reactance that is due to the stiffness or elasticity of the system. Thus, in summary, increments of mass load on the oscillator vary the natural period of the oscillator, and the oscillation amplitude varies in consonance with the resulting change in differential between the period of the oscillator and the period of the driving force, and hence indicates the change in period, as well as the mass loading of the oscillator, or in other words, the specific gravity of the liquid.

The change in amplitude and velocity of vane movement with liquids of increasing specific gravities may be either an increase or a decrease, depending upon whether the natural controlling period of the oscillator unloaded, or with light liquid load, is above or below the period of the driving force. An instrument constructed in accordance with the above given specifications has, as before stated, a fundamental periodicity in air of about 45 cycles, and a second harmonic periodicity in air of about 90 cycles. Operating with a driving frequency of 60 cycles, the second harmonic is found to dominate, and as the vane is immersed in liquids of increasing specific gravities, the approach of the resulting decreasing second harmonic periodicity toward the fixed driving frequency causes an approach toward a condition of resonance, so that vane amplitude and velocity increase.

The amplitude of vane movement of a present actual embodiment of the invention increases from a minimum of a few thousandths of an inch to a maximum of approximately one-thirty second of an inch when immersed in liquids of increasing specific gravities. However, as will be evident, increase in vane amplitude and velocity with increasing specific gravities cannot be considered as a limiting condition, since merely tuning the oscillator to a dominant natural period which is below the driving frequency will reverse the behavior, causing decreases in vane amplitude and velocity with increases in specific gravity.

The variation in amplitude and velocity of vane movement are thus measures of the change in the natural period of the oscillator caused by the mass loading of the oscillator by the liquid, and hence of the specific gravity of the liquid. The indication may be taken off the oscillator in a number of ways, various suitable means giving an indication varying consonantly with vane amplitude or velocity being applicable. For example, it is known that a mechanical oscillator driven from a coil by electromagnetic coupling behaves exactly like a net-work of inductance, capacitance and resistance in circuit with the coil. And changes in the mass or resistance components of the mechanical impedance into which the oscillator works bring about changes in the currents flowing in the circuit feeding the coil which are exactly the same as though corresponding changes in inductive reactance and electrical resistance were made in the equivalent net work. Accordingly, changes in current flow in the circuit of the driving coil, or the voltage across said coil, are indicative of changes in the mass reactance of the liquid load on the oscillator, or in other words, of the specific gravity of the liquid. Also, there is a phase shift between the alternating driving force for the vane and vane velocity as resonance is approached, which is indicative of the mass reactance of the liquid load, and therefore of specific gravity. The corresponding phase shift between voltage and current flow in the exciting coil are similarly indicative of variations in specific gravity. All these effects vary in consonance with vane amplitude and velocity, and a measurement of any one might be made though in any given instance the indication method must of course be appropriate to the physical constants of the instrument.

The present simple illustrative embodiment employs an indication system comprising the above described flexible reeds 21, which vibrate with the vane, but bend or deflect through a substantially increased angle, which depends upon the amplitude of vane movement. In other words, the reeds serve to provide an amplified movement, which may be more readily observed, or measured, than the movement of the vane or of the mounting member 15 to which the vane is solidly attached. And while the specific gravity could be ascertained by visually observing the angular deflection of the reeds, a more accurate indication is obtained by reading the voltage or current generated by the coil 24 carried by the reeds. Since increase in the amplitude of reed vibration, accompanying increase in amplitude of vane vibration, increases the speed with which generating coil 24 cuts the lines of force between pole extensions 45, the voltage generated by the coil is proportionately increased in like degree, and this voltage, or the resulting current flow, may be read by a meter 30.

Variations in viscosity affect the instrument to a negligible extent. This appears to be due, at least in part, to the fact that in moving the liquid the vane moves only a short distance and offers only small peripheral edge surfaces in frictional contact of the liquid, while it moves a comparatively large mass of the liquid. The effect of mass loading as compared with frictional losses is also made large by the rapid vibration of the vane. And, of course, viscosity or other frictional losses, to whatever relative extent they remain present, have in any event no objectionable effect at all on the resonant frequency of the oscillator, variation of which with changing specific gravity is the fundamental effect relied on by the present invention.

It will be understood that the drawing and description are to be taken as merely illustrative of and not restrictive on the invention, since various changes in design, structure and arrangement may be made without departing from the spirit and scope of the invention or of the appended claims.

I claim:

1. In a device of the character described, the combination of an elastically pivoted beam, a vane on the free end of said beam having a fluid contacting surface which moves in a direction normal to itself when said beam rocks on its pivot axis, means for applying vibratory energy to said beam to cause it and the vane to vibrate in said normal direction, and means for giving an indication that varies in consonance with vane amplitude.

2. In a device of the character described, vibratory means embodying a fluid immersible vane, having a relatively broad fluid contacting surface, mounting means for mounting said vibratory means for movement in a direction such that said vane travels substantially at right angles to its said fluid contacting surface, a flexible, resilient vibratory member connected with said vibratory means adapted to flex in the direction of vibratory movement of said vibratory means, means for applying vibratory energy to said vibratory means at a frequency corresponding substantially to the natural period of said flexible, resilient vibratory member, whereby said member will vibrate with said vibratory means but at magnified amplitude, and means for indicating the amplitude of vibration of the vibratory member.

3. In a device of the character described, the combination of: supporting means, a resilient vibratory reed pivotally mounted on said supporting means, vibratory means connected to the pivoted end portion of said reed, said vibratory means including a vane immersible in a fluid and having a substantial fluid contacting surface which travels normally to itself with vibration of said vibratory means, means for vibrating said reed at a frequency corresponding approximately to its natural vibratory period, and means for indicating the amplitude of vibration of said reed.

4. In a device of the character described, the combination of: supporting means, a reed mounting pivotally mounted on said supporting means, a resilient vibratory reed mounted on said mounting, vibratory means connected to said reed mounting, said vibratory means including a vane immersible in a fluid and having a substantial fluid contacting surface which travels normally to itself with vibration of said vibratory means, means for vibrating said reed at a frequency approximately corresponding to its natural vibratory period, and means for indicating the amplitude of vibration of the reed comprising a coil carried by the free end of said reed, means establishing a magnetic field cut by said coil as the reed vibrates, and an indicating instrument fed by the output current of said coil.

5. In a device of the character described, the combination of: supporting means, a reed mounting elastically pivotally mounted on said supporting means, a resilient vibratory reed mounted on said mounting, vibratory means connected to said reed comprising a vane-like element having a substantial fluid contacting surface immersible in a fluid and movable normally to itself with pivotal movement of said reed mounting, means for vibrating said reed and the vane-like element, and means for indicating the amplitude of vibration of the reed.

6. In a device of the character described, the combination of: supporting means, a reed mounting pivotally mounted on said supporting means, a resilient vibratory reed mounted on said mounting, vibratory means connected to said reed mounting having a substantial fluid contacting surface immersible in a fluid and movable normally to itself with pivotal movement of said reed mounting, a magnetic armature carried by said vibratory reed, an exciting coil surrounding said reed and adapted to polarize said armature, said exciting coil being adapted to be excited by an alternating current of frequency approximately corresponding to the natural vibratory period of the reed, means creating a magnetic field for the polarized reed armature, in a direction transversely of the reed, and means for indicating the amplitude of reed vibration.

7. In a device of the character described, the combination of: supporting means, a reed mounting pivotally mounted on said supporting means, a resilient vibratory reed mounted on said mounting, vibratory means connected to said reed mounting having a substantial fluid contacting surface immersible in a fluid and movable normally to itself with pivotal movement of said reed mounting, a magnetic armature on said vibratory reed, an exciting coil surrounding said reed and adapted to polarize said armature, said exciting coil being adapted to be excited by an alternating current of frequency approximately corresponding to the natural vibratory period of the reed, means creating a magnetic field for the polarized reed armature, in a direction transversely of the reed, and means for generating an electric current of a voltage which is a function of the amplitude of reed vibration, embodying a coil carried by the reed, and means establishing a magnetic field cut by said coil as the reed vibrates.

ERNEST G. ASHCRAFT.